B. ZABEL.
THEFT SIGNAL FOR VEHICLES.
APPLICATION FILED DEC. 7, 1917.
1,295,410.
Patented Feb. 25, 1919.
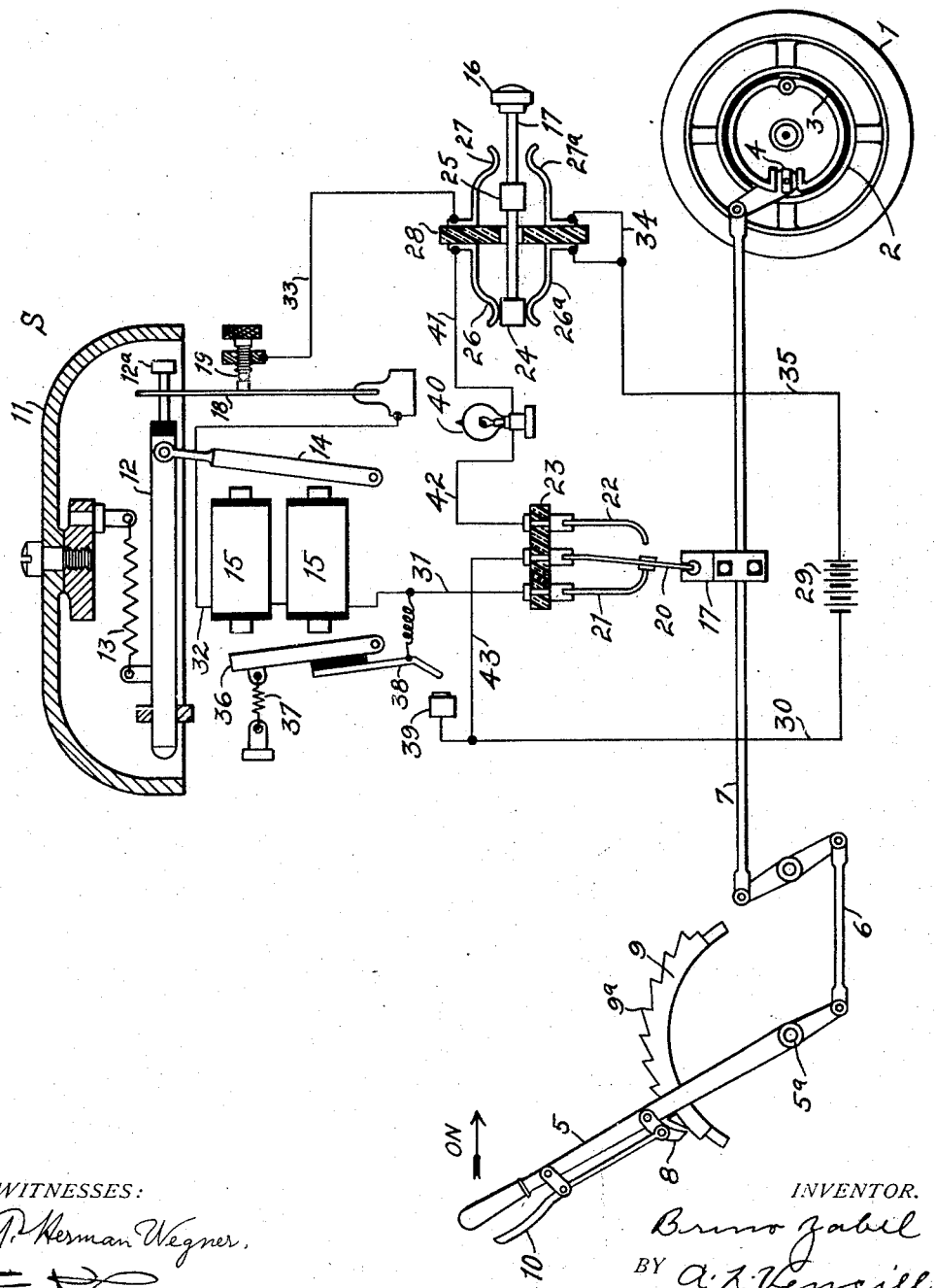
WITNESSES:
INVENTOR.
Bruno Zabel
BY
His ATTORNEY.

UNITED STATES PATENT OFFICE.

BRUNO ZABEL, OF EDGEWOOD BOROUGH, PENNSYLVANIA.

THEFT-SIGNAL FOR VEHICLES.

1,295,410.          Specification of Letters Patent.          Patented Feb. 25, 1919.

Application filed December 7, 1917. Serial No. 205,931.

*To all whom it may concern:*

Be it known that I, BRUNO ZABEL, a citizen of the United States, residing at Edgewood borough, in the county of Allegheny and State of Pennsylvania, have invented certain new and useful Improvements in Theft-Signals for Vehicles, of which the following is a specification.

My invention relates to theft signals for automobiles or other vehicles, that is, to signals for detecting and announcing the use of the vehicle or tampering therewith by an unauthorized person.

My present invention is an improvement on the apparatus shown and claimed in my United States Letters Patent No. 1236526, issued on August 14, 1917, and on the apparatus shown in my co-pending application for Letters Patent of the United States, filed August 3, 1917, Serial No. 184227.

I will describe one form and arrangement of theft signal apparatus embodying my invention and will then point out the novel features thereof in claims.

The accompanying drawing is a view, partly diagrammatic, showing one form and arrangement of theft signal apparatus embodying my invention.

Referring now to the drawing, it is understood that all of the apparatus shown therein is carried by an automobile or other vehicle, one wheel of which is shown in the drawing and is designated by the reference character 1.

The vehicle is provided with a theft signal designated S, which signal comprises a gong 11 and a tapper 12. The tapper 12 is biased away from the gong by a spring 13, but may be moved to the left to strike the gong by means of an armature 14 controlled by an electromagnet 15. The electromagnet 15 is provided with a circuit which is controlled by suitable instrumentalities on the vehicle, as hereinafter explained, whereby the circuit may be closed in case of attempted theft of the vehicle. The circuit for this electromagnet is also controlled by a contact 18—19, which contact is closed while the armature 14 is in released position, but is opened by a shoulder $12^a$ on the tapper when the tapper is thrown to the left to strike the gong. This contact 18—19, therefore, causes continuous operation of the theft signal when the circuit controlling the same is closed at all other points.

The wheel 1 is provided with the usual brake drum 2 within which is located an expanding brake band 3, controlled in the usual manner by a cam 4. This cam is operatively connected with the usual brake lever 5 through the medium of links 6 and 7, the lever 5 being pivoted at $5^a$ to the framework of the vehicle. The lever 5 is provided with a dog 8, which is controlled by a latch 10, and which coacts with projections $9^a$ on a fixed segment 9. When the lever 5 is in the position in which it is shown in the drawing, the brake is fully released; to apply the brake the lever 5 is swung in clockwise direction, as indicated on the drawing.

Fixed to the framework of the vehicle is a block 23 carrying a contact finger 20 which is movable into engagement with a contact finger 21 or with another contact finger 22. The contact member 20 is controlled by a yoke 17 fixed to the brake controlling link 7, whereby member 20 is caused to engage with finger 21 when the brake is released, and with finger 22 when the brake is applied.

The reference character 16 designates a manually operable signal controlling member or button which is preferably in a location known only to the owner or to an authorized operator of the vehicle. This button 16 is fixed to a longitudinally movable rod 17 carrying two contact bridging members 24 and 25. Bridging member 24 is adapted to form an electrical connection between two contact springs 26 and $26^a$, whereas the bridging member 25 is adapted to form an electrical connection between two contact springs 27 and $27^a$. The contact springs 26, $26^a$, 27, and $27^a$, are suitably mounted on a block 28 of insulating material which is attached to a convenient part of the vehicle body. When the manually operable member 16 is in the position shown, which I will term the "inoperative" position, block 24 forms a bridge across contact springs 26 and $26^a$, whereas the contact formed by springs 27 and $27^a$ is open; when, however, the member 16 is moved to the right to what I will term its "operative" position, the contact formed by springs 26 and $26^a$ is opened, but contact springs 27 and $27^a$ are bridged by the block 25.

The theft signal S is controlled by contact 20—21 governed by the brake lever, and by contact 27—$27^a$, which is governed by the button 16. The control of the theft signal by these two contacts is such that the signal is operated when the member 16 is in the operative position and the brake is released. To accomplish this control the electromagnet 15 is provided with a circuit which is as follows: from a battery 29, through wires 30 and 43, contact 20—21, wire 31, windings of magnet 15, wire 32, contact 18—19, wire 33, contact 27—25—27ª, wires 34 and 35 to battery 29. It will be seen, therefore, that this circuit is closed only when button 16 is in the operative position and the brake is released, and it will also be seen that when the circuit is closed the signal S will be operated continuously due to the intermittent opening of contact 18—19.

The operation of the apparatus thus far described, is as follows:

While the vehicle is in motion, the button 16 is in the inoperative position, so that the circuit for magnet 15 is opened at this point, whereby the theft signal is not affected by the position of the brake lever. When, however, the vehicle is brought to a stop and is to be left without an attendant, the brake is applied and button 16 is moved to the operative position, thus closing at this point the circuit for signal S. This circuit is open, however, at contact 20—21, so that the signal is not set into operation. If now an attempt is made by an unauthorized person to move the vehicle, the brake must first be released, and this operation closes contact 20—21, so that the signal S is set into operation and will call attention to the fact that an attempt is being made to steal the vehicle.

It will be apparent that with only the apparatus thus far described, if an attempt were made by an unauthorized person to move the vehicle, the signal would be set into operation upon the release of the brake, but could immediately be suppressed by again applying the brake. It is desirable, however, that when the signal has once been set into operation by an attempted theft its operation should continue regardless of anything which the unauthorized person may do. To accomplish this result, I provide a second armature 36 which is controlled by the electromagnet 15 and which is normally held in retracted position, as shown in the drawing, by a spring 37. This armature is so adjusted that it is attracted to the cores of the magnet when the magnet is energized, but that it does not release in the interval during which the magnet 15 is deënergized due to the opening of contact 18—19; that is, armature 16 is so adjusted that the small amount of residual magnetism remaining in the cores of magnet 15 will hold this armature in attracted position for a brief interval of time, which interval is only slightly greater than the interval during which the circuit for the magnet is opened at contact 18—19. It follows then that armature 36 will be attracted upon the first energization of magnet 15 when the signal is set into operation and will remain in attracted position as long as the signal is operating, but will return to retracted position shortly after the circuit for this signal is opened at an outside point. In the form herein shown, armature 36 constitutes the back-strap of magnet 15, although this construction is not essential. Armature 36 controls a contact 38—39 which is closed when the armature is in the attracted position, and which contact opens and closes a branch of the signal circuit around contact 20—21. It follows then that when the signal is once set into operation by the release of the brake, contact 20—21 is shunted by contact 38—39, so that the operation of the signal continues even though the brake be reapplied. After being set into operation, signal S can, of course, be suppressed by reversing button 16, but this can only be done by the owner or other authorized person who knows the location of such button.

It will be seen from the foregoing, that the theft signal S would be useless if the owner or driver of the car should neglect to place the button 16 in the operative position when the vehicle is to be left unattended. In order to guard against such failure to utilize the signal, I preferably provide an indicator, such as an electric lamp 40, which lamp becomes illuminated when the brake is applied and the button 16 is in the inoperative position. The circuit for this lamp 40 is from battery 29, through wire 35, contact 26ª—24—26, wire 41, lamp 40, wire 42, contact 22—20, wires 43 and 30, to battery 29. It will be seen that this circuit is closed when the brake is applied and the button 16 is in the inoperative position. The lamp 40 is preferably located on the cowl of the vehicle where it can be readily seen by the driver. When the vehicle is brought to a stop and the brake is applied, it follows that if the button 16 is left in the inoperative position, lamp 40 will be illuminated to call the driver's attention to the fact that the button should be reversed. The reversal of the button will, of course, extinguish the lamp.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a vehicle, a theft signal thereon, a circuit for said signal including a contact controlled by the vehicle brake and open or closed according as the brake is applied or released, said circuit also including a normally open manually operable contact, a branch for said circuit around the brake-controlled contact and including a normally open third contact, and means controlled by said theft signal for closing said third contact when the signal starts to operate and for keeping it closed as long as the signal continues in operation.

2. In combination, a vehicle, a theft signal thereon, comprising a gong and a tapper, a magnet, an armature controlled by said magnet for actuating said tapper to strike the gong when the magnet is energized, a circuit for said magnet including a source of current, a contact controlled by said armature for opening said circuit each time the armature is attracted, said circuit including a contact operatively connected with the vehicle brakes and closed or open according as the brakes are released or applied, and said circuit also including a normally open manually controlled contact, a second armature for said magnet arranged to be attracted when the magnet is energized but so adjusted that it does not release during the interval in which the magnet is de-energized by the contact controlled by the first armature, and a branch for said circuit around the brake controlled contact and including a contact which is closed while the second armature is in attracted position, whereby when the manually controlled contact is closed and the brakes are released the warning signal is set into operation and is not stopped by subsequent re-application of the brakes.

3. In combination, a vehicle, a theft signal thereon, a circuit for said signal including a contact controlled by the brakes of the vehicle and open or closed according as the brakes are applied or released, a manually operable member on the vehicle for closing or opening said circuit at another point according as said member is in operative or inoperative position, an indicator, and means controlled by said brakes and by said member for rendering said indicator operative when the brakes are applied and the member is in the inoperative position.

4. In combination, a vehicle, a theft signal thereon, a manually operable member on the vehicle having an operative and an inoperative position, means controlled by said member and by the brakes of the vehicle for actuating said signal when the brakes are released and said member is in operative position, and an indicator controlled also by said member and by said brakes and operative when the brakes are applied and said member is in the inoperative position.

5. In combination, a vehicle, a manually operable member thereon having an operative and an inoperative position, a theft signal on the vehicle controlled by said member and by the brakes of the vehicle and operative when the member is in operative position and the brakes are released, and an indicator controlled also by said member and by said brakes and operative when the brakes are applied and said member is in the inoperative position.

6. In combination, a vehicle, a theft signal thereon in the form of a vibrating electric bell, a circuit for said bell including a contact controlled by the vehicle brake and closed only when the brake is released, said circuit also including a normally open manually operable contact, an armature arranged to be attracted by the magnet of said bell when the bell begins to operate and to remain in attracted position as long as the bell continues in operation, and a branch for said circuit around the brake-controlled contact and including a third contact which is closed only when said armature is in the attracted position.

In testimony whereof I affix my signature in presence of two witnesses.

BRUNO ZABEL.

Witnesses:
A. HERMAN WEGNER,
E. R. CRUM.